United States Patent
Cannara et al.

[11] Patent Number: 6,145,865
[45] Date of Patent: Nov. 14, 2000

[54] COMBINED TRAILER HITCH COVER AND STEP ASSEMBLY

[75] Inventors: Raymond C. Cannara, Ortonville; Steve Won, Rochester; Trevor M. Creed, West Bloomfield; Robert J. Janosko, Bloomfield Hills, all of Mich.

[73] Assignee: DaimlerChrysler Corporation

[21] Appl. No.: 09/215,182

[22] Filed: Dec. 17, 1998

[51] Int. Cl.⁷ ...................................................... B60D 1/01
[52] U.S. Cl. ...................... 280/507; 280/491.1; 280/500
[58] Field of Search ............... 280/415.1, 491.1, 280/491.3, 491.4, 504, 507, 511, 512, 432, 500

[56] References Cited

U.S. PATENT DOCUMENTS

| | | | |
|---|---|---|---|
| 2,446,347 | 8/1948 | Walkowiak | 280/507 |
| 2,510,782 | 6/1950 | Johnson | 280/507 |
| 2,601,993 | 7/1952 | McCall | 280/507 |
| 3,716,254 | 2/1973 | Tarvin | 280/500 X |
| 3,774,952 | 11/1973 | Zorn | 280/500 X |
| 4,040,641 | 8/1977 | Riecke | 280/507 |
| 4,852,902 | 8/1989 | Young et al. | 280/507 |
| 5,184,840 | 2/1993 | Edwards | 280/507 |
| 5,476,279 | 12/1995 | Klemetsen | 280/415.1 |
| 5,603,178 | 2/1997 | Morrison | 40/591 |
| 5,628,536 | 5/1997 | Fulerson | 280/507 X |
| 5,829,774 | 11/1998 | Klemp | 280/507 |
| 5,934,699 | 8/1999 | Blake | 280/507 |
| 5,947,506 | 9/1999 | Bauer | 280/507 |
| 6,019,386 | 2/2000 | Morelock | 280/507 |

*Primary Examiner*—J. J. Swann
*Assistant Examiner*—F. Zeender
*Attorney, Agent, or Firm*—Mark P. Calcaterra

[57] ABSTRACT

An apparatus conceals a trailer hitch socket and provides a step. The apparatus includes a generally planar main body portion having a first side and second side. The apparatus further includes a mounting arrangement for pivotally interconnecting the generally planar main body portion for articulation between a first position and a second position. In the first position, the generally planar main body portion is vertically oriented and conceals the trailer hitch socket. In the second position, the trailer hitch socket is horizontally oriented and provides the step.

5 Claims, 2 Drawing Sheets

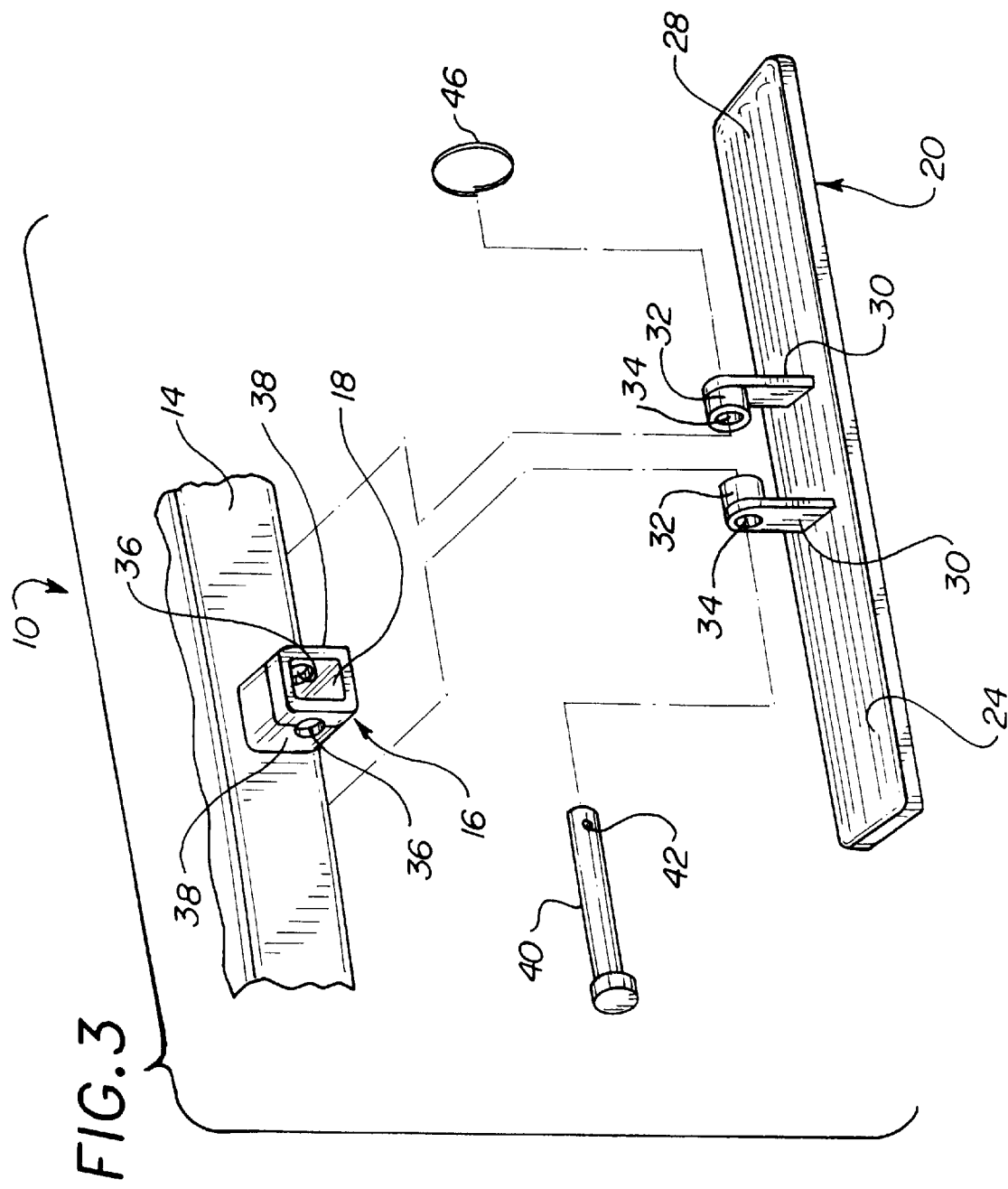

COMBINED TRAILER HITCH COVER AND STEP ASSEMBLY

BACKGROUND OF THE INVENTION

1. Technical Field

The present invention generally pertains to motor vehicles. More particular, the present invention pertains to a combined trailer hitch cover and step assembly for a motor vehicle.

2. Discussion

Hitchballs or ball hitches for releasably engaging gooseneck arrangements on trailer are often welded, bolted or otherwise permanently attached to a motor vehicle. The ball hitches come in various standard sizes that are chosen for a particular goose-neck arrangement. Where the ball hitch is permanently attached to the motor vehicle, trailers having different sized goose-neck arrangements may not be readily towed.

To overcome this problem various arrangements have been proposed in the relevant art which allow a member carrying the ball hitch to be removably interconnected with the motor vehicle. In one such arrangement, a mounting receptacle is fixedly attached to the motor vehicle. Multiple ball hitch assemblies are available each having a tongue portion adapted to be telescopically received within the mounting receptacle sleeve. Each of the ball hitch assemblies has a different size ball hitch fixedly secured thereto.

While arrangements of the type discussed above including removably attached ball hitches have provided certain advantages, they are all associated with certain disadvantages. Significantly insofar as the present invention is concerned, the arrangements are aesthetically unappealing, particularly when the motor vehicle is not required for towing and the tongue portion has been removed.

SUMMARY OF THE INVENTION

In view of the above, it is a general object of the present invention to provide a combined trailer hitch cover and step assembly.

In one form, the present invention provides an apparatus for covering a trailer hitch socket and providing a step in combination with the trailer hitch socket. The trailer hitch socket includes a pair of spaced apart vertical sides with aligning apertures. The apparatus includes a generally planar main body portion and a mounting arrangement. The generally planar main body portion has a first side and a second side. The mounting arrangement pivotally interconnects the generally planar main body portion to the trailer hitch socket for articulation between a first position in which the main body portion conceals the trailer hitch socket and a second position in which the second side of the generally planar main body portion is horizontally oriented to provide the step. The mounting arrangement preferably interconnects the generally planar main body portion for pivotal movement between the first and second positions and includes first and second spaced apart flanges extending from the second side of the generally planar main body portion. Each flange includes an aperture aligning with the aligning apertures of the hitch socket. First and second converging boss portions are provided on the first and second flange portions, respectively. The apertures of the first and second flange portions pass through an associated one of the first and second boss portions. A pin passes through the apertures of the flange portions and the aligning apertures of the hitch socket and defines a pivot axis.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 3 is an enlarged and exploded view of the combined trailer hitch cover and step assembly of the present invention.

DETAILED DESCRIPTION OF THE PREFERRED EMBODIMENT

Figure 1:
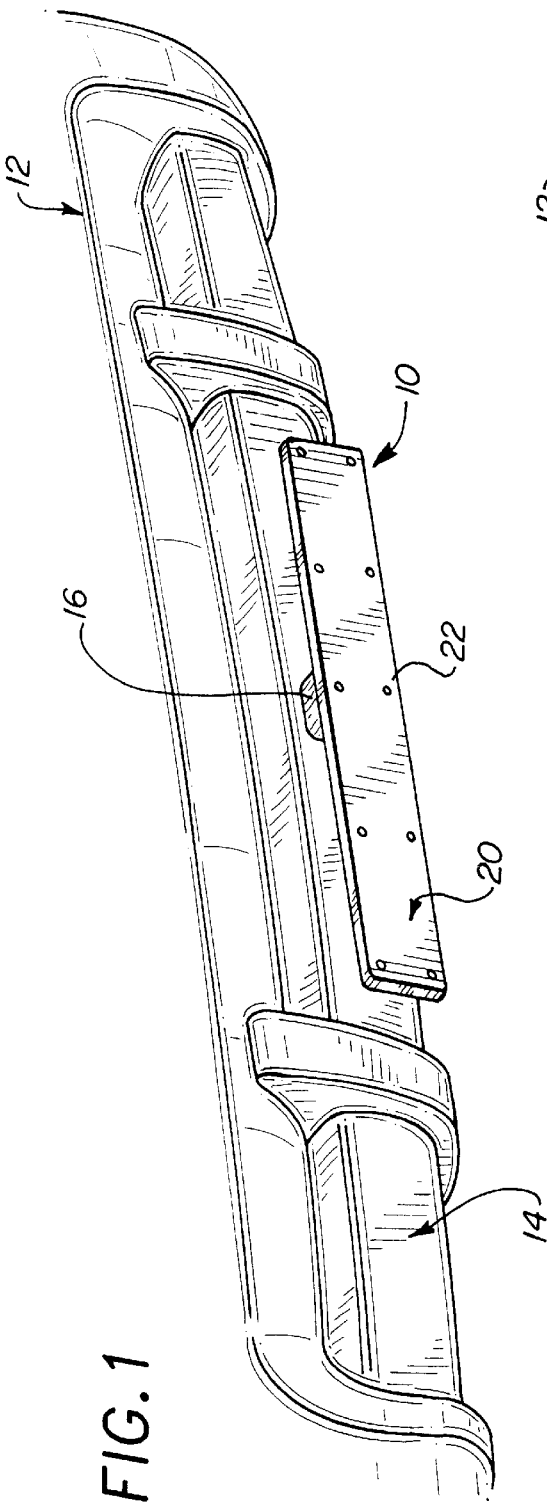
FIG. 1 is a perspective view of a combined trailer hitch cover and step assembly constructed in accordance with the teachings of a preferred embodiment of the present invention illustrated operatively associated with an exemplary motor vehicle and showing the assembly articulated to a first position.

With initial reference to FIG. 1, an apparatus constructed in accordance with the teachings of the preferred embodiment of the present invention is generally identified with reference numeral 10. The apparatus is illustrated as a combined trailer hitch cover and step assembly 10 operatively associated with a conventional motor vehicle 12. However, it will be understood that the drawings are merely exemplary and that the teachings of the present invention have broader application than that shown.

The motor vehicle is shown to include a rear bumper assembly 14. Fixedly attached to the rear bumper 14 in a known manner is a mounting receptacle or hitch socket 16 of a conventional receiver hitch. Conventionally, the mounting receptacle 16 is generally rectangular in shape. The mounting receptacle 16 defines a generally rectangular opening 18 for removably receiving a tongue portion (not shown) of the receiver hitch.

Figure 2:
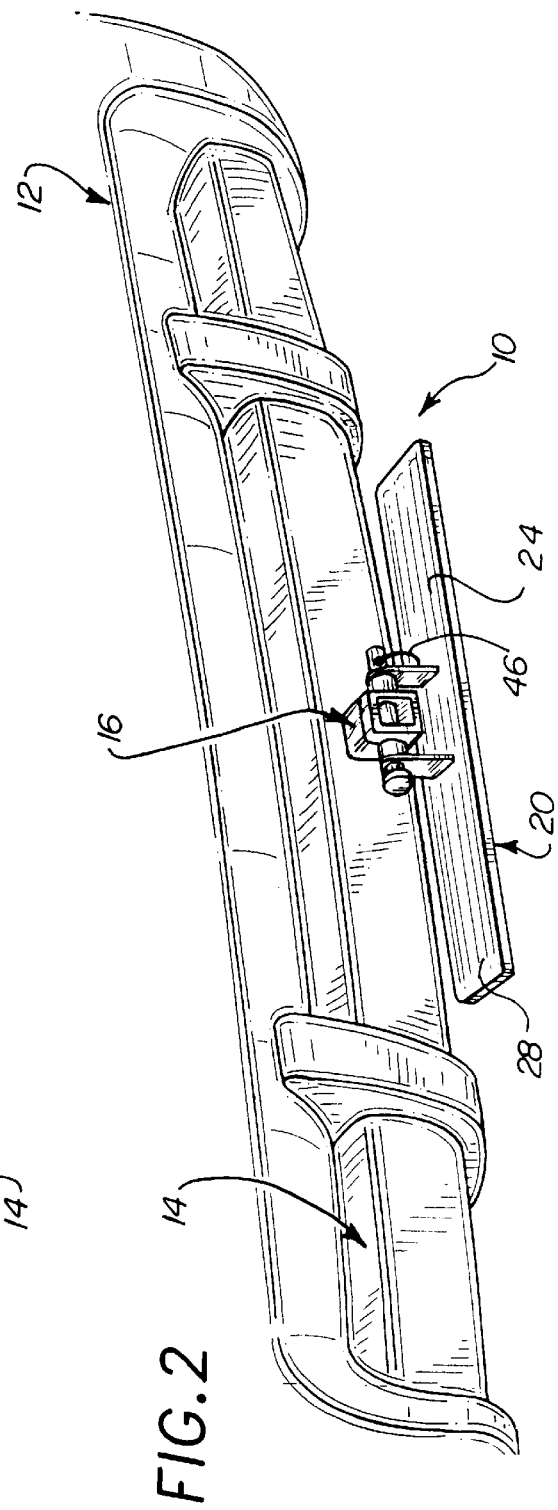
FIG. 2 is a perspective view similar to FIG. 1, illustrating the combined trailer hitch cover and step assembly articulated to a second position.

With continued reference to FIG. 1 and additional reference to FIGS. 2 and 3, the combined hitch cover and step assembly 10 of the present invention is illustrated to include a main body portion 20 constructed from metal or other suitable material. The main body portion 20 is generally planar and includes a first side 22 and a second side 24. The main body portion 20 is operatively interconnected with the mounting receptacle 16 for articulation between a first position and a second position. In the first position, the main body portion 20 is vertically oriented and conceals the mounting receptacle 16 from view. In this position, the first side 22 of the main body portion 20, which is generally smooth and uninterrupted complements the appearance of the bumper assembly 14.

In the second position, the main body portion 20 is horizontally oriented with the second side 24 thereof upwardly facing. In the preferred embodiment, the second side 24 includes a plurality of grooves 28. In the exemplary arrangement illustrated, the plurality of grooves 28 extend laterally with respect to the vehicle 12. In the second position, the main body portion 20 provides a step which can be used to easily access the roof rack of the vehicle 12, for example, without precariously climbing on the bumper assembly 14. The plurality of grooves 28 provide the climber with additional traction.

In the preferred embodiment, the main body portion 20 is pivotally interconnected to the bumper assembly 14. Even more preferably, the main body portion 20 is pivotally attached to the mounting receptacle 16 of the receptacle hitch. As illustrated most clearly in the exploded view of FIG. 3, the combined trailer hitch cover and step assembly 10 includes a pair of spaced flange members 30 which rearwardly extend from the second side 24 of the main body portion 20. A pair of boss portions 32 with aligning apertures 34 are provided on the facing sides of the flange members 30. Another pair of aligning apertures 36 is provided in the opposing vertical sides 38 of the mounting receptacle 16.

The main body portion 20 is pivotally interconnected to the mounting receptacle 16 by a mounting pin 40 which passes through the apertures 34 of the flange members 30 and the apertures 36 of the mounting receptacle 16. The mounting pin 40 defines an axis of rotation about which the main body portion 20 rotates between its first and second positions. To retain the mounting pin 40 in position, an aperture 42 is provided adjacent a first end thereof 44 which is engaged by a ring 46 in a known manner. It will be appreciated by those skilled in the art that alternative means for retaining the pin 40 may be also employed.

While not particularly shown, it will be understood that it may be desirable in certain applications to bias the main body portion 20 of the combined hitch cover and step assembly 10 to its first position (as shown in FIG. 1).

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A motor vehicle comprising:

a rear bumper;

a trailer hitch socket extending from the rear bumper, the trailer hitch socket including first and second spaced apart sides each having an aperture;

an apparatus for covering the trailer hitch socket and providing a step, the apparatus including:
  a generally planar main body portion including a first side and a second side; and
  a mounting arrangement removably connecting the generally planar main body portion directly to the trailer hitch socket for articulation about an axis passing through the trailer hitch socket between a first position in which the main body portion conceals the trailer hitch socket and a second position in which the second side of the generally planar main body portion is horizontally oriented to provide the step, the mounting arrangement including first and second spaced apart flange portions extending from said second side, each flange portion including an aperture aligning the apertures of the hitch socket, said mounting arrangement further including a pin passing through said apertures of said flange portions and the apertures of the first and second spaced sides of the hitch socket.

2. The motor vehicle of claim 1, wherein the mounting arrangement pivotally interconnects the generally planar main body portion for movement between the first and second positions.

3. The motor vehicle of claim 1, wherein the mounting arrangement further includes first and second boss portions on the first and second flange portions, respectively, the apertures of the first and second flange portions passing through an associated one of the first and second boss portions.

4. The motor vehicle of claim 1, wherein the second side includes a plurality of laterally extending grooves.

5. The motor vehicle of claim 1, wherein the main body portion is adjacent to the rear bumper in the first position.

* * * * *